July 30, 1963   P. A. STEIN   3,099,079
TOOL FOR PLACEMENT OF BUSHINGS IN A DRILL JIG
Filed Dec. 12, 1961
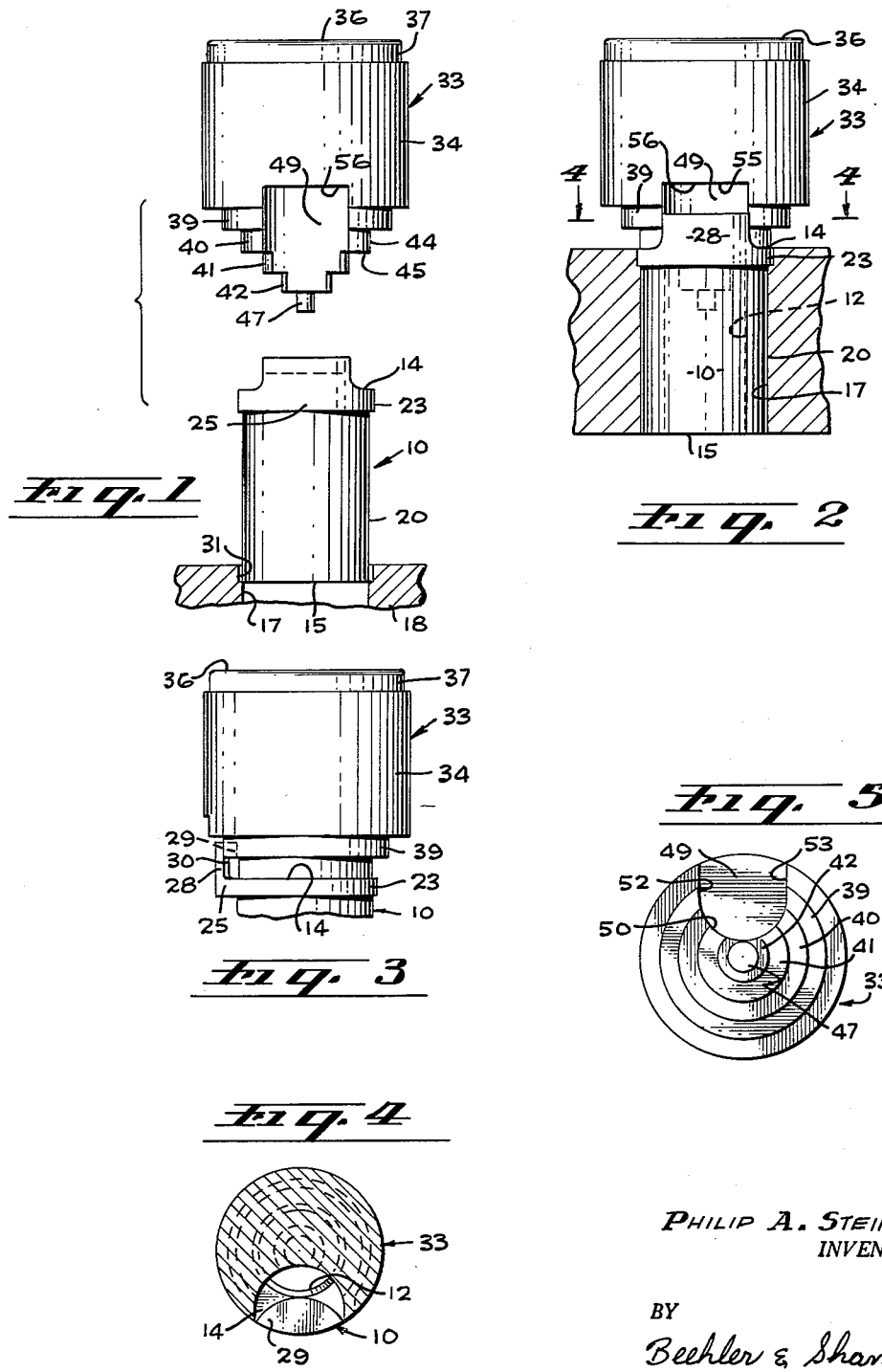
PHILIP A. STEIN
INVENTOR.
BY
Beehler & Shanahan
ATTORNEYS United States Patent Office 3,099,079
Patented July 30, 1963

3,099,079
TOOL FOR PLACEMENT OF BUSHINGS IN A DRILL JIG
Philip A. Stein, Los Angeles, Calif., assignor to American Drill Bushing Company, Los Angeles, Calif., a corporation of Maryland
Filed Dec. 12, 1961, Ser. No. 158,803
1 Claim. (Cl. 29—275)

This invention relates generally to a tool for use in positioning a bushing in a drill jig block, and it relates particularly to a tool which is useful for placement of liner bushings of the general type exemplified by those illustrated and described in an application for United States patent, Serial No. 852,885, filed November 13, 1959, entitled "Liner Bushings for Slip Renewable Tool Guide Bushings," now Patent No. 3,015,242, issued January 2, 1962.

Jigs of the type for which the tool of this invention is designed to be employed may be of very large expanse and may have a large number of holes through which a drill or other work tool is guided for performing operations on a work piece in a pattern corresponding to the arrangement of holes in the jig. Such jigs are employed as templates in mass production operations requiring adherence to close tolerances and accordingly, replaceable bushings are used in the jig to define the tool guide openings whereby the bushings may be replaced when the tool guide openings become worn. As it may be desired to perform several different work operations using the same jig but with bushings of different sized tool guide openings, liner bushings are employed to mount the tool guide bushings in the jig. The tool of this invention is to be used for positioning liner bushings in a jig plate.

It is a general object of this invention to provide a tool of the above mentioned character which is simple in construction, reliable in operation, and economical to manufacture, and adapted to be used with any of a series of selected standard sizes of liner bushings.

Further objects and advantages of the invention will appear in the course of the following part of this specification wherein the details of construction and mode of use of a specific embodiment of the invention are described with reference to the accompanying drawing, in which:

FIG. 1 is an exploded view showing a tool of this invention spaced above a liner bushing to be driven into a jig plate, the tool and the bushing being shown in side elevation and the jig plate being represented as a portion thereof in vertical section;

FIG. 2 is a side elevation of the tool and liner bushing in a position following driving of the bushing into the jig plate, the plate being shown as a portion thereof in vertical section;

FIG. 3 is a side elevation of the tool and of the upper portion of the bushing, the view being taken in a direction at right angles to the line of sight for FIG. 2;

FIG. 4 is a cross section through the tool and bushing taken upon a plane indicated by line 4—4 on FIG. 2; and, FIG. 5 is an end view of the tool.

Referring to the drawing in greater detail and with the use of reference numerals, the liner bushing which is shown therein is designated generally by reference numeral 10, it being of the general type illustrated and described in the aforementioned patent application, Serial No. 852,-885. The bushing is formed of hard steel and has an open-ended cylindrical bore 12 extending axially therethrough. The opposite end surfaces of the bushing around the bore are a top annular end surface 14 and a bottom annular end surface 15. In FIG. 1, the bushing is shown in position ready to be driven into a cylindrical opening 17 of a jig plate 18. Such jig plate may be of very large expanse having many such openings 17 scattered throughout its area in a pattern to serve as a template for use in performing work operations upon a work piece (not shown). The jig plate 18 may be formed of metal or of suitable hard plastics e.g., fiber glass reinforced plastics.

The axial length of the bushing, i.e., longitudinal dimension between its end surfaces 14 and 15 is preferably equal to the thickness of the plate as is illustrated in FIG. 2 of the drawing whereby the annular end surfaces of the bushing are flush with respective surfaces of the plate. The outside surface 20 of the illustrated liner bushing 10 is cylindrical and of circular cross section for fitting tight within the plate opening 17.

The liner bushings serve to mount tool guide bushings in the jig. The tool guide bushings (not shown) are removable from the liner bushings to permit replacement of the tool guide bushings for changing from one work operation with a drill, for example, of one size to a work operation using a drill of another size. The liner bushings are also made to different standard sizes, such that each size is usable with a group of tool guide bushings having different sized tool guide openings.

Liner bushing 10 has an outside annular flange 23 contiguous the upper end of the bushing, the upper side surface of the flange being in a plane of the annular end surface 14 of the bushing. For the greater part of its circumferential extent around the bushing, the flange is of small radial dimension. At one side of the bushing the flange extends radially outward as an arc portion 25 and thence upwardly beyond the annular end surface 14 to form one member 28 of a lock for interengagement with a slip renewable tool guide bushing (not shown), the lock element on such tool guide bushing being complementary to the lock element 28 of the liner bushing. At its upper end the lock element 28 has a tongue 29 extending radially inward, thus to define a recess 30 under the tongue for reception of a complementarily formed tongue on the lock element of the tool guide bushing to be received in the liner bushing. The lock element 28 is of a selected circumferential extent such that it is subtended by an acute central angle of the liner bushing of from about 30° to 90°.

The jig plate has an annular groove 31 around the upper end of its opening 17 for reception of the flange 23, thereby to prevent rotation of the liner bushing in the jig plate.

The tool of this invention is designated generally by reference 33. It is preferably solid and formed of any suitable metal e.g., aluminum. The tool is circular in cross section and has a cylindrical shank portion 34 large enough for convenience in handling the tool. Its upper end is a flat surface 36 at which the tool is struck to drive the liner bushing into the jig plate. In the illustrated embodiment the tool is of slightly reduced diameter at its upper end as indicated at 37.

At its lower end the tool extends in a series of circular steps 39 to 42 respectively of progressively smaller diameter. Each step has a cylindrical riser surface 44 and a circular tread surface 45 at right angles to each other. The circular steps are concentric on the longitudinal axis of the tool, they being progressively smaller in diameter of their riser surfaces as the space between their respective tread surfaces and said flat strike surface 36 increases. More particularly, the steps are graduated in diameter in increments to correspond respectively to a series of selected standard sizes for bores of liner bushings. A central pin portion 47 extends out from the center of the step 42.

The tool has a recess 49 for accommodating the lock element 28 of the liner bushing. This recess is defined by an arcuate surface portion 50 at its inner extent radially of the tool, it being parallel to the longitudinal axis of the tool. Such arcuate cylindrical surface, defining the radial inward extent of the recess, continues outwardly of the tool as two parallel side surfaces 52 and 53. The recess extends through each of the steps 39–42, and extends into the shank portion of the tool at 55 so as to be long enough to accommodate the locking element of a liner bushing of a size or of a bore size to receive the step 41. The upper end wall of the recess is designated by reference numeral 56, it being disposed in a plane perpendicular to the longitudinal axis of the tool. The generatrix line on the cylindrical surface portion 50 defining the inwardmost extent of the recess 49 lies in an axial plane of the tool and such line is substantially aligned with that generatrix of the cylindrical surface of the pin step 47 which is disposed in said axial plane.

In the operation of staking a liner bushing 10 in a jig plate, the tool 33 is placed upon the liner bushing with that particular step of the tool which corresponds in diameter to the diameter of the bore of the liner bushing extending into the bore and with the tread surface of the next larger or upper step being in flush abutment against the top annular end surface 14 of the liner bushing, and with the lock element 28 of the liner bushing extending into the recess 49 of the tool. Thus by tapping the tool, it will cause the liner bushing to be driven into its jig plate opening 17.

In the case of setting liner bushings in a mold for forming a jig plate of hard plastics e.g., fiber glass, the tool 33 will serve advantageously in positioning the liner bushings for making of the bushing layout.

While the invention has herein been shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices.

Having thus described the invention, what is claimed as new in support of Letters Patent is:

A tool for use in positioning a liner bushing in a jig plate, the liner bushing being of the type having an open-ended bore extending axially therethrough and of a diameter equal to one of a series of selected standard sizes, said bore serving to receive a tool guide bushing of the selected standard size, the liner bushing having an upper annular flat surface defining an end opening of the bore, and having a locking member extending upwardly from the periphery of said flat surface and being of a selected circumferential extent such that it is subtended by an acute central angle of the tool, said tool having a cylindrical shank with a flat strike surface at one end and a series of circular steps at its other end, each step having a cylindrical riser surface and circular tread surface at right angles to each other, the center of each step being on the longitudinal axis of the tool, the steps being progressively smaller in diameter of their riser surfaces as the space between them and said flat strike surface increases, the series of steps being graduated in diameter in increments to correspond to said standard sizes respectively, a central cylindrical pin step of circular cross-section and of smaller diameter than the smallest step of said series of steps and extending axially of said series from the tread surface of said smallest step, and the tool having a cylindrical recess extending longitudinally through the steps of said series and into said shank and being open at the circumferences of the steps of said series, with the inwardmost extent of the recess being along a line extending in an axial plane of the said steps, said line being substantially aligned with that generatrix of the cylindrical surface of the pin step which is disposed in said axial plane, whereby the recess accommodates said locking member when the tool is placed on the liner bushing with that step which corresponds in diameter to said bore extending into the bore and with the tread surface of the next larger step being in flush abutment against said upper annular flat surface of the liner bushing.

References Cited in the file of this patent
UNITED STATES PATENTS

| 2,377,304 | Appel | June 5, 1945 |
| 2,441,981 | Stelzer | May 25, 1948 |